(12) United States Patent
Holcombe et al.

(10) Patent No.: US 6,360,090 B1
(45) Date of Patent: Mar. 19, 2002

(54) METHOD AND APPARATUS FOR RECEIVING INFRARED SIGNALS WITH IMPROVED NOISE IMMUNITY

(75) Inventors: Wayne T. Holcombe, Palo Alto; Brian B. North, Los Gatos, both of CA (US)

(73) Assignee: Integration Associates, Inc., Mountain View, CA (US)

( * ) Notice: Subject to any disclaimer, the term of this patent is extended or adjusted under 35 U.S.C. 154(b) by 0 days.

(21) Appl. No.: 09/383,295

(22) Filed: Aug. 25, 1999

Related U.S. Application Data
(60) Provisional application No. 60/098,188, filed on Aug. 26, 1998.

(51) Int. Cl.[7] .................................................. H04B 1/10
(52) U.S. Cl. ..................... 455/307; 455/296; 379/56.3; 348/189
(58) Field of Search ............................. 455/307, 334, 455/338, 339, 337, 296; 379/56.3; 375/317; 348/189; 250/214 AL, 214 B, 214 C, 338.1

(56) References Cited

U.S. PATENT DOCUMENTS 4,648,126 A * 3/1987 Toffolo ........................ 455/212
5,361,395 A    11/1994 Yamamoto
5,884,153 A    3/1999 Okada
5,917,865 A    6/1999 Kopmeiners et al.
5,974,098 A *  10/1999 Tsuda ........................ 375/340
6,018,650 A    1/2000 Petsko et al.
6,038,049 A    3/2000 Shimizu et al.

* cited by examiner

Primary Examiner—Dwayne Bost
Assistant Examiner—Lewis G. West
(74) Attorney, Agent, or Firm—Vernon W. Fraucissen

(57) ABSTRACT

Disclosed is a method and apparatus for receiving infrared signals that is better able to receive a data signal in the presence of a noise signal. The method according to the present invention involves bandwidth filtering an incoming signal that includes a data signal and a noise signal. The bandwidth filtered signal is then averaged to obtain an average alternating current (AC) value signal of the bandwidth filtered signal. The average AC value signal is integrated to obtain a detect level adjustment signal. The detect level adjustment signal is summed with a minimum detect threshold value to obtain a detection level signal. The incoming signal is then compared to the detection level signal in order to produce a received data signal.

29 Claims, 11 Drawing Sheets

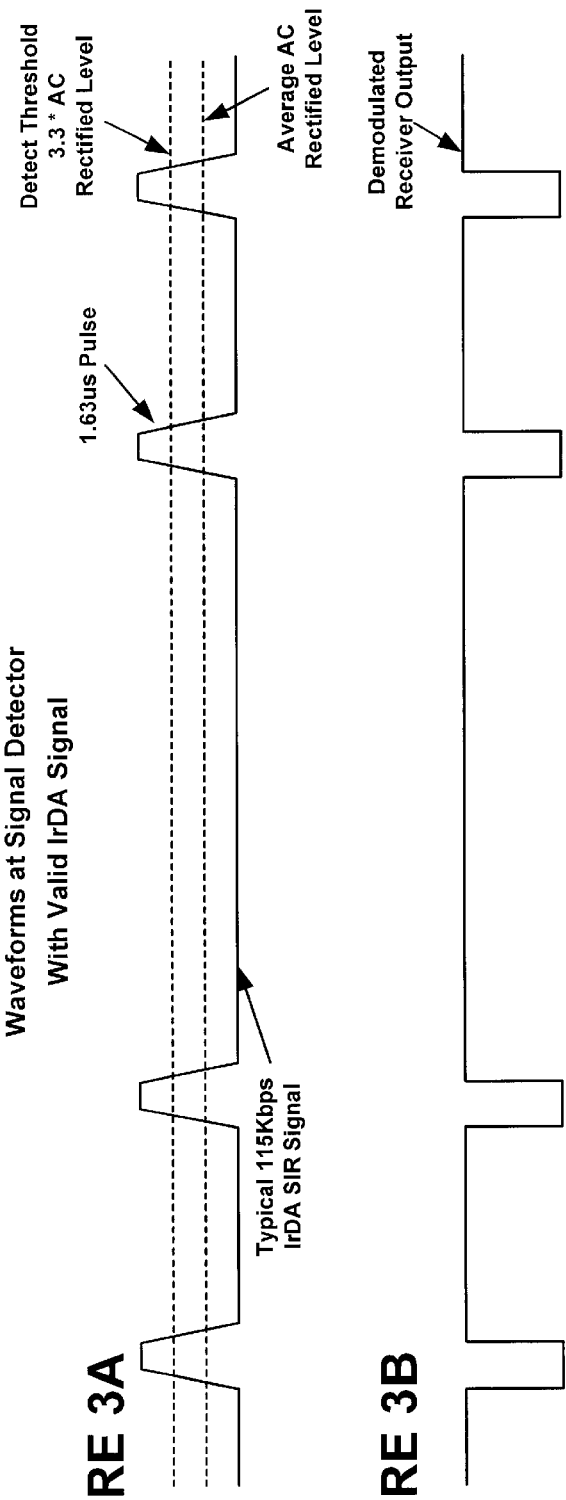
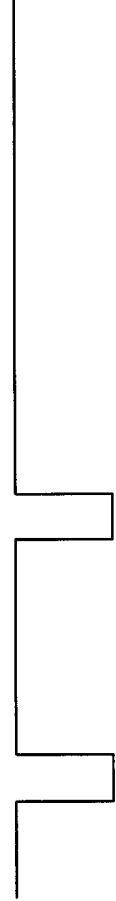
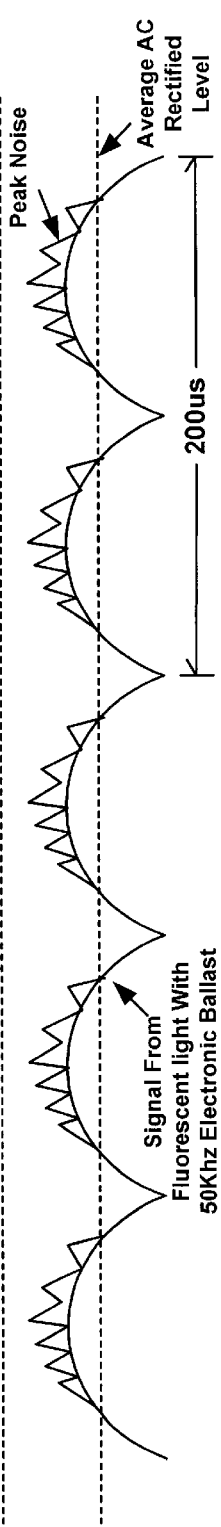
FIGURE 3A
FIGURE 3B
FIGURE 3C
FIGURE 3D

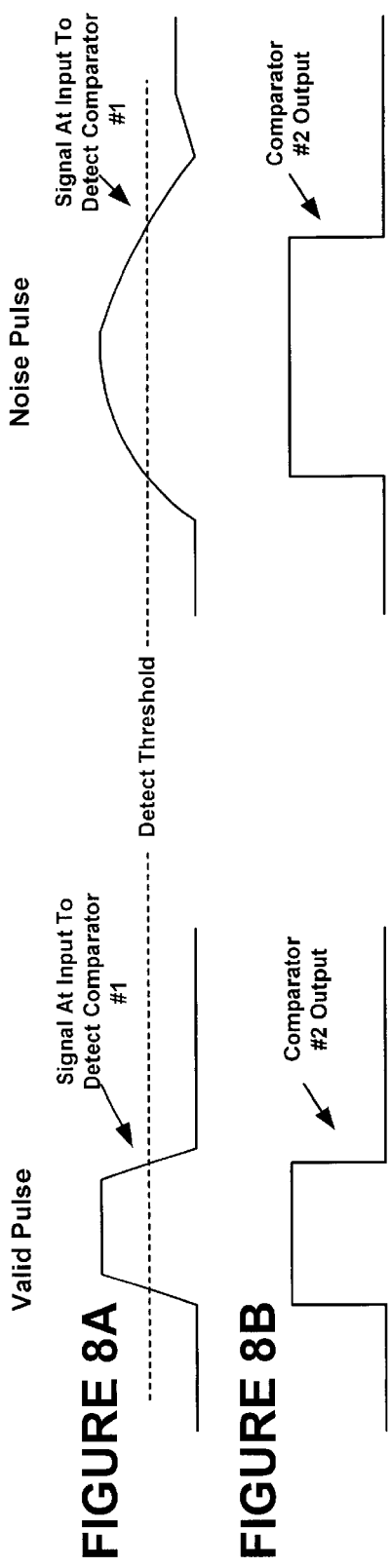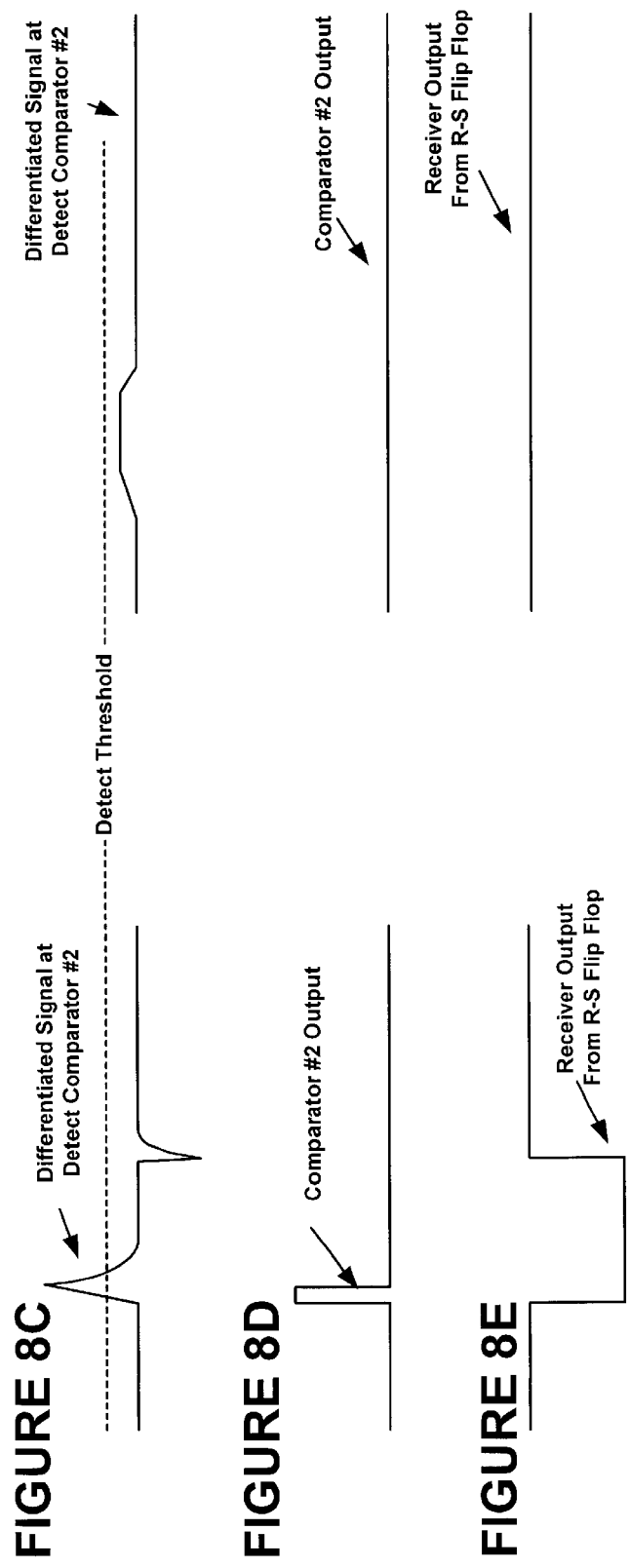
FIGURE 8A
FIGURE 8B
FIGURE 8C
FIGURE 8D
FIGURE 8E

METHOD AND APPARATUS FOR RECEIVING INFRARED SIGNALS WITH IMPROVED NOISE IMMUNITY

This application claims the benefit of U.S. Provisional Application No. 60/098,188, filed Aug. 26, 1998.

FIELD OF THE INVENTION

The present invention is directed toward data communications and, more particularly, a method and apparatus having improved immunity from infrared noise from fluorescent lights and other sources.

BACKGROUND OF THE INVENTION

Infrared wireless data communication is a useful method for short range (in the approximate range of 0–10 meters) wireless transfer of data between electronic equipment; such as, cellular phones, computers, computer peripherals (printers, modems, keyboards, cursor control devices, etc.), electronic keys, electronic ID devices, and network equipment. Infrared wireless communication devices typically have the advantages of smaller size, lower cost, fewer regulatory requirements, and a well defined transmission coverage area as compared to radio frequency wireless technology (i.e. the zone of transmission is bounded by physical walls and therefore more useful in an office environment). In addition, infrared wireless communication has further advantages with regard to reliability, electro magnetic compatibility, multiplexing capability, easier mechanical design, and convenience to the user as compared to cable based communication technology. As a result, infrared data communication devices are useful for replacing 0–10 meter long data transfer cables between electronic devices, provided that their size and costs can be reduced to that of comparable cable technology.

Infrared data communications devices typically consist of transmitter and receiver components. The infrared data transmitter section consists of one or more infrared light emitting diodes (LEDs), an infrared lens, and an LED current driver. A conventional infrared data receiver typically consists of an infrared photodiode and a high gain receiver amplifier with various signal processing functions, such as automatic gain control (AGC), background current cancelling, filtering, and demodulation. For one-directional data transfer, only a transmitter at the originating end and a receiver at the answering end is required. For bi-directional communication, a receiver and transmitter at each end is required. A combined transmitter and receiver is called a transceiver.

In typical high volume applications, it is now standard practice to fabricate the receiver circuitry and transmitter driver in a single integrated circuit (IC) to produce a transceiver IC. In turn, a transceiver IC, infrared photodiode and LED along with lenses for the photodiode and LED are assembled together in a plastic molded package designed to be small in size and allow placement in the incorporating electronic device so as to have a wide angle of view (typically through an infrared window on its case). The transceiver IC is designed to digitally interface to some type of serial data communications device such as an Infrared Communication Controller (ICC), UART, USART, or a microprocessor performing the same function.

A representative example of a conventional infrared data transmitter and receiver pair is shown in FIG. 1. Infrared transmitter 10 includes LED 16 which generates a modulated infrared pulse in response to transistor 14 being driven by the input data signal $D_{IN}$. The modulated infrared signal is optically coupled to an infrared detector, such as photodiode 24 normally operated in current mode (versus voltage mode) producing an output current which is a linear analog of the optical infrared signal falling on it. The infrared pulses generated by LED 16 strike photodiode 24 causing it to conduct current responsive to the transmitted input data signal $D_{IN}$ thereby generating a received data signal at $D_{IR}$.

Data can be modulated on the infrared transmitted signal by any of a number of well known methods. Two of the most popular methods are defined by the Infrared Data Association (IrDA) and Sharp corporation (Sharp ASK). IrDA Physical Layer Link Specification 1.1e specifics two main physical layer infrared modulation methods. One method is a low-speed (2 Kbp/s to 1.15 Mbp/s) on-off infrared carrier asynchronous modulation where the presence of a pulse indicates a 0 bit and the absence of a pulse indicates a 1 bit. The second method is a high speed (4 Mb/s) synchronous Four Pulse Position Modulation (4 PPM) method in which the time position of a 125 ns infrared pulse in a 500 ns frame encodes two bits of information. The Sharp ASK method is similar to the low speed IrDA method but also modulates the infrared carrier with a 500 Khz signal to facilitate differentiating between a valid signal and ambient infrared signals.

In receiver 20, the received signal at $D_{IN}$ is transformed into a voltage signal and amplified by amplifier 26. The signal output from amplifier 26 then feeds into comparator 42 which demodulates the received signal by comparing it to a detection threshold voltage $V_{DET}$ in order to produce a digital output data signal at $D_{OUT}$.

The received signal waveform will have edges with slope and will often include a superimposed noise signal. As a result, $V_{DET}$ is ideally placed at the center of the received signal waveform so that the output data signal has a consistent waveform width despite the slope of the received signal edges. Also, placing $V_{DET}$ at the center of the received signal improves the noise immunity of receiver 20 because the voltage difference between $V_{DET}$ and both the high and low levels of the received signal is maximized such that noise peaks are less likely to result in spurious transitions in $D_{OUT}$.

The received signal, however, can vary in amplitude by several orders of magnitude due primarily to variations in the distance between transmitter 10 and receiver 20. The strength of the received signal decreases proportional to the square of the distance. Depending on the range and intensity of the infrared transmitter, the photodiode outputs signal current in the range of 5 na to 5 ma. plus DC and AC currents arising from ambient infrared sources of sunlight, incandescent and florescent lighting. As a consequence, the center of the received signal waveform will vary, whereas $V_{DET}$ must generally be maintained at a constant level. To address this problem, receivers typically include an automatic gain control mechanism to adjust the gain responsive to the received signal amplitude. The received signal is fed to AGC peak detector 36 which amplifies the signal and drives current through diode 32 into capacitor 28 when the signal exceeds the AGC threshold voltage $V_{AGC}$ in order to generate a gain control signal. The gain control signal increases in response to increasing signal strength and correspondingly reduces the gain of amplifier 26 so that the amplitude of the received signal at the output of amplifier 26 remains relatively constant despite variations in received signal strength.

At a minimum, infrared receiver 20 amplifies the photodetector signal current and then level detects or demodulates the signal when it rises above the detect threshold $V_{DET}$ thereby producing a digital output pulse at $D_{OUT}$. For improved performance, the receiver may also perform the added functions of blocking or correcting DC and low frequency AC ambient (1–300 ua) signals and Automatic Gain Control (AGC) which improves both noise immunity and minimizes output pulse width variation with signal strength.

As noted above, infrared data receivers are vulnerable to infrared ambient noise in their environments. This noise produces spurious outputs and degrades performance by causing bit errors. The predominate sources of noise for infrared receivers in most common environments are (1) photocurrent shot noise from background ambient infrared light; (2) other infrared data transmitters; and (3) fluorescent lights.

Of these three sources, infrared noise from fluorescent lights is typically the most disruptive and most difficult and expensive to mediate. For wideband IrDA devices, receiver optical sensitivity is limited to a value that is as much as 10 times less than is practically possible so as to limit interference from fluorescent lights. Consequently, a low-cost remedy to fluorescent light noise would desirably improve the reliability of infrared communication and allow significantly increased range.

Although the dominant source of infrared ambient light is from sunlight and incandescent lights, this infrared signal is only moderately disruptive to infrared communication since virtually all of the signals produced by these sources are below 200 Hz. As long as the receiver input circuits can handle the DC and low frequency currents produced by these sources, the main source of noise is due to photocurrent shot noise, which is proportional to the square root of the photocurrent.

In an IrDA device, if the total signal to noise falls below about 12 db, then the error rate will become excessive. Consequently, the receiver detect level needs to be set at least 12 db above the maximum shot noise likely to be encountered. If the detect threshold is set too low, then the receiver will produce spurious outputs in high ambient light environments while if the detect threshold is set too high the receiver gain and consequently its range will be significantly reduced to less than is possible in typical light ambients.

A good method for mitigating shot noise so as to prevent spurious receiver outputs is to use a form of adaptive gain control (AGC), as is illustrated in FIG. 1. Since shot noise can be calculated from the photodiode DC current and receiver bandwidth, an effective AGC technique is to measure the DC photocurrent, square root its value, and use the result to set the detect threshold so that detection always occurs at least 12 db above the noise floor. One problem with this technique is that in high light ambients and with typical IrDA photodiodes of 4 square millimeters, the receiver gain may be reduced by several fold, requiring the user to reduce range. However, operation in such high light ambients tends to be infrequent, and the consequent reduction in range is usually acceptable.

In addition to the photodiode shot noise, incandescent lights produce a small noise component modulated at harmonics of the power line frequency of 50–60 Hz. Because the incandescent element has a slow response, there is very little infrared noise radiated above several hundred hertz. For most infrared data receivers, low frequency power line harmonics can be removed by high pass filtering of the amplified receive signal from the photodiode before applying the signal to the signal detector or demodulator. Filtering the low frequency harmonics does not effect reception of the desired infrared signal since most infrared communication signals are at frequencies above 10 Khz. Often, the circuit used to remove the DC ambient component from the photodiode can effectively filter out these low frequency noise components.

Another noise source arises from infrared data transmitters commonly used for a wide variety of wireless communication applications. It is not uncommon to have several different varieties of infrared data transmitters and receivers within receiving range of each other. For example, most consumer electronic remote controls for TVs, VCRs, Stereos, Cable and Satellite TV controls use infrared transmitters. Less commonly, some wireless audio systems use infrared transmitters that produce continuous trains of infrared pulses. Many computer keyboards, cursor pointing devices (mouse, trackball, etc.), and other computer input devices use infrared transmitters to allow wireless operation.

Although these devices use transmit LEDs which radiate on a different infrared wavelength than IrDA transmit LEDs, the difference in wavelength is not sufficient to allow any significant filtering with commonly used low-cost infrared filters. Consequently, these devices have a significant potential to interfere with each other. However, because most infrared control devices operate at low duty cycle and/or with a directed beam, they generally interfere minimally with other infrared devices.

Many infrared communication devices, including IrDA devices, have data transfer protocols that retransmit packets that are lost due to such intermittent interference. However, this technique is not effective against devices that transmit continuously and produce continuous interference, such as infrared based wireless audio systems.

Fluorescent lights produce visible light arising from the narrow band fluorescence of the phosphors inside the fluorescent light tube. The average continuous infrared output from a fluorescent light is significantly less than that of sunlight or an incandescent light for a given visible light output. However, what infrared light is present tends to be significantly noisier in band than infrared light from incandescent lights or sunlight.

Fluorescent light noise arises from the way that the light is generated. In a fluorescent light, phosphors are excited to emit visible light by ultraviolet light radiated from excited mercury vapor ions recombining with electrons. Passing an electric current through the mercury vapor ionizes the mercury atoms. Although most of the light emitted by the mercury vapor is ultraviolet, there is a small infrared component that is also radiated. This infrared light arises from a lesser transition line (1013 microns) radiated by the mercury vapor ion and some of this infrared light leaks pass the fluorescent phosphors.

For fluorescent lights with standard ballasts, AC power line noise may modulate the infrared emitted from the mercury vapor. In addition, the ionized mercury vapor has a non-linear conductivity response, which can readily produce an infrared signal modulated by high frequency harmonics of the power line frequency. For fluorescent lights with high frequency electronic ballasts, the mercury vapor is modulated with harmonics of the electronic ballast switching frequency, which is commonly in the 20 Khz–100 Khz range and consequently can produce significant infrared modulations in these frequency ranges.

Although infrared noise arising from fluorescent lights is limited to frequencies below 200 Khz, this is still within a significant portion of the frequency band of many infrared communications devices, including IrDA devices, and is of sufficient amplitude in many environments to cause disruption of infrared communication. Consequently, it is desirable to mitigate this noise. There are a number of known noise mitigation methods, which have varying effectiveness and cost.

One method for mitigating this type of noise is to use a narrow band optical filter, such as a dielectric filter, to block out the interfering infrared mercury vapor line. Dielectric filters are constructed of layers of light transparent materials having different dielectric constants. The thickness of the layers are usually exact fractional multiples of the wavelength of light being filtered, either to pass or block.

In addition to blocking noise from fluorescent lights, this type of filter can also be very effective against other infrared noise sources. A narrow band optical filter will reduce photodiode shot noise because it reduces the total amount of broadband infrared falling on the photodiode. Because it reduces the total amount of infrared energy it also reduces the total amount of noisy infrared signal passed to the receiver from the photodiode. It can also reduce interference from other infrared devices operating on different wavelengths.

However, despite the highly effective performance of dielectric optical filters, they tend to be very expensive. The cost of a dielectric filter is typically many times the cost of the packaged infrared receiver and photodiode, which raises the total cost of an infrared receiver incorporating a dielectric filter to a level that is typically not competitive against other wired or wireless communication methods. To avoid the cost of dielectric filters, wideband absorption type filters are commonly used instead of narrow-band filters. Although wideband filters pass most infrared frequencies, they will block visible light and prevent noise arising from this part of the spectrum, since photodiodes typically have a very wide spectral response.

Another optical method commonly used to reduce interference noise in infrared receivers is to use lensing and shading. In this approach, the infrared receiver typically has a lens assembly and shading mechanism, which may be part of the case housing the device. The lensing and shading limits the view of the photodiode to the horizontal plane, since infrared transmitters are normally in this plane and interfering light sources are usually above this plane. This method is fairly low-cost, but has only a limited effectiveness, reducing infrared light noise pickup by less than 10 db.

Yet another method used to mitigate noise is to use signal bandwidth filtering in the receiver circuit. Like optical wavelength filtering, the effectiveness of this method depends upon making the filter as narrow as possible. For typical infrared receivers used for remote control, the bandwidth of the signal may be as little as several kilohertz, since these devices demodulate a subcarrier that has a data rate of less than one kilobit per second. However, for IrDA type data receivers the bandwidth is much wider ranging from tens of kilohertz to over 10 Mhz. Consequently, bandwidth filtering for wideband IrDA devices is much less effective. In addition, if the filter is too narrow, then data distortion will result, causing bit errors.

Still another well-known method for mitigating noise is to retransmit packets that are not received correctly. This method is most effective against burst noise and requires noise free intervals between bursts of noise in order to permit the sending of complete packets. Some communication protocols shorten packet lengths dynamically in noisy environments in order to increase the probability of a packet getting through the communications channel. Although retransmission of dynamically sized packets improves immunity to burst noise, such protocols are more complex and more costly to implement in processor resources than is generally desirable for short-range communication. In addition, retransmission of packets is not an effective remedy for continuous noise sources.

Another receiver circuit based method for mitigating noise is the use of some form of adaptive gain control. Adaptive gain control reduces the gain of the receiver in response to input signals according to specific algorithms, so as to produce minimum signal disruption. A common form of adaptive gain control, generally known as Automatic Gain Control (AGC), is used in some infrared receiver systems to both normalize signal levels so as to provide correct pulse width at the detector and to improve noise immunity. As discussed above, receiver 20 of FIG. 1 includes AGC.

Automatic Gain Control works by lowering the receive gain for signals that are typically at least twice the detector threshold. In receiver 20, the voltage level of $V_{AGC}$ determines the signal level at which AGC amplifier 36 begins to reduce the gain, i.e. increase the attenuation, of input amplifier 26. By normalizing the signal at the detector, AGC produces a more uniform pulse width despite large variations in input signal level, and despite long pulse decay typical of a photodiode signal source.

Although it is not immediately apparent, automatically reducing the gain to normalize the signal level at the detector will significantly improve noise immunity. Without gain reduction, any noise above the detect threshold will produce spurious detector outputs between receive pulses even if the receive pulses are much larger than the noise signal. These extra spurious output pulses cause errors in the data stream.

The benefit of automatic gain control occurs when the received signal pulses drive the receiver gain downward so that the noise falls below the detect level. Automatic gain control typically has a fast attenuation attack speed and a slow attenuation recovery process. The AGC attack speed is designed to quickly bring the attenuation of input amplifier 26 up to its final value within a few pulses. The AGC attenuation decay rate is much longer and is typically set to a value intended to sustain significant attenuation between gaps in the data transmission, thus providing significant noise immunity between valid data pulses, preventing spurious outputs.

In receiver 20, the AGC circuit of the receiver is designed such that AGC amplifier 36 rapidly charges up capacitor 28 responsive to high signal levels in order to reduce the gain of input amplifier 26. The charge on capacitor 28 will then slowly decay by discharging to ground through capacitor 30.

For infrared data systems using AGC, in situations where the signal to noise degrades such that communication fails, the intuitive response of the user is to place the receiver and transmitter closer together so as to "bring them into communication range". This does not decrease the noise, but rather increases the signal level at the receiver, and hence increases the receiver attenuation via the AGC response, which consequently decreases the noise level at the detector. Since infrared systems typically rely on user placement of infrared transmitters and receivers, they normally provide some feedback about whether data transfer is successfully occurring. If transfer is not occurring, then the user moves the receiver and transmitter into range so as to increase the receive signal.

Although automatic gain control is beneficial to suppress noise below the signal level, this is only true so long as a signal is present. Once signal transmission and reception ceases, AGC recovery takes place wherein the receiver attenuation decays to its minimum, as the charge on capacitor 28 drains through resistor 30, at which point ambient noise may cause a spurious output.

This spurious output, if too frequent, will cause disruption of the IrDA protocol. This is because the IrDA protocol is designed to benignly co-exist with other infrared communication systems. The IrDA protocol assumes that any output that it does not recognize is due to some other infrared communication. As a result the IrDA device suspends any attempt at transmitting until it hears no signals for hundreds of milliseconds, so as to prevent interfering with any other infrared communication. However, since the IrDA protocol cannot differentiate between noise and unrecognizable communication, any spurious output recurring with less than a several hundred millisecond interval will prevent communication between IrDA devices, even when they are close enough so that the signal strength suppresses noise with AGC action.

Despite this limitation, AGC still improves noise immunity since it minimizes data disruption in the presence of noise once an IrDA device starts transmitting. Also, the ambient noise at the transmitting IrDA device may be lower than at the receiving device. Consequently, despite the presence of high spurious outputs from one IrDA device, these may not block the initiation of communication by another IrDA device not likewise experiencing high spurious outputs.

Therefore, it is desirable to improve the reliability and maximum range of IrDA communication by reducing spurious outputs arising from ambient infrared noise while not otherwise compromising receiver performance. Accordingly, there remains a need for a method and apparatus for addressing noise in an infrared receiver to improve performance, but without the drawbacks of the conventional solutions.

SUMMARY OF THE INVENTION

In accordance with preferred embodiments of the present invention, some of the problems associated with conventional transmission of data on infrared communications systems are overcome. One aspect of the invention includes a method for suppressing ambient noise on an infrared communications link.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein:

FIGS. 3A–D are waveform diagrams illustrating the function of the receiver circuit of FIG. 2;

FIGS. 8A–E are waveform diagrams illustrating the function of the output circuit of FIG. 7;

DETAILED DESCRIPTION OF THE PRESENT INVENTION

The present invention is directed toward suppressing undesirable spurious output signal transitions in an infrared receiver caused by infrared ambient noise, such as that arising from fluorescent lights, that is input to the receiver. The present invention is also effective against noise from other sources, either infrared or electromagnetic noise, which may be coupled into the receiver input.

Figure 2:
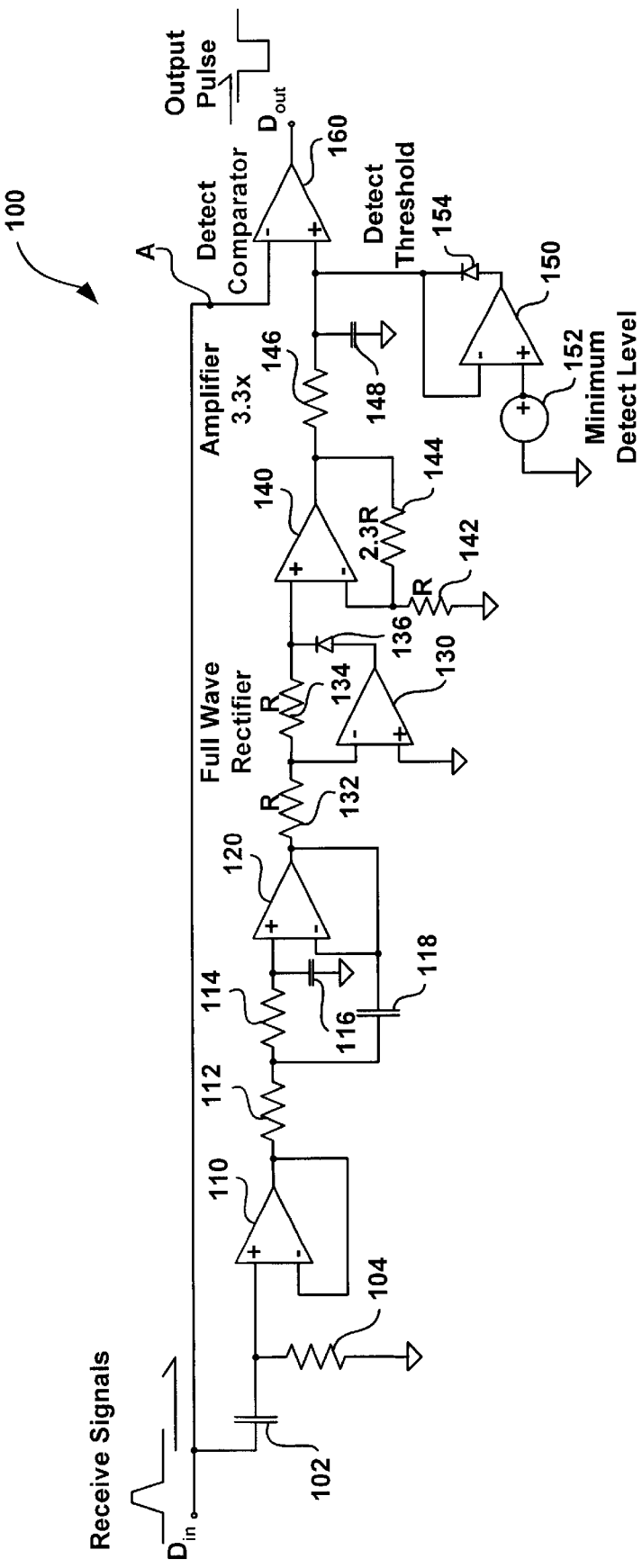
FIG. 2 is a functional block diagram illustrating an embodiment of a infrared receiver circuit according to the present invention.

FIG. 2 is a functional block diagram illustrating an embodiment of a receiver 100 according to the present invention. Receiver 100 has an input terminal $D_{IN}$ for receiving an incoming signal that may include a data signal component and a noise signal component. Receiver 100 also has an output terminal $D_{OUT}$ for outputting an output data signal generated by the receiver.

The incoming signal received at DIN is input to a bandpass filter portion of receiver 100. $D_{IN}$ is connected through capacitor 102 and across resistor 104 to a positive input terminal of amplifier 110. An output terminal of amplifier 110 is coupled to a negative input terminal of the amplifier and through resistors 112 and 114 and across capacitor 116 to a positive input terminal of amplifier 120. The output terminal of amplifier 120 is coupled to a negative input terminal of the amplifier and is coupled through capacitor 118 to a common node between resistors 112 and 114. This bandpass filter circuit allows a predetermined frequency bandwidth signal to pass to the output of amplifier 120.

The output of amplifier 120 is connected to a full-wave rectifier portion of receiver 100. The output of amplifier 120 is coupled through resistor 132 to a negative input terminal of amplifier 130. A positive input terminal of amplifier 130 is coupled to a ground potential contact. An output terminal of amplifier 130 is coupled through diode 136 to a positive input terminal of amplifier 140. The output terminal of amplifier 130 is also coupled through diode 136 and resistor 134 to a negative input terminal of amplifier 130. Note that resistors 132 and 134 have approximately the same level of resistance.

Thus, this portion of receiver 100 produces a full wave rectified signal at the cathode of diode 136 from the bandwidth filtered signal output by amplifier 120. This portion of the circuit can also be viewed as averaging the signal peaks present in the bandwidth filtered signal.

An output of amplifier 140 is connected through resistor 144 to a negative input terminal of the amplifier and through resistor 142 to the ground potential contact. The ratio of the resistance of resistor 144 to resistor 142 is approximately 2.3 in order to obtain a gain of 3.3 from amplifier 140. Amplifier 140 thus scales the rectified signal received from amplifier 130 for output through a low pass filter composed of resistor 146 and capacitor 148 to a positive input terminal of amplifier 160. The low pass filter integrates the output of amplifier 140 in order to produce an adaptive detect threshold level signal.

The positive input terminal of amplifier 160 also receives a minimum detect threshold value produced by amplifier 150. A positive input terminal of amplifier 150 is coupled to a voltage reference 152 that generates a predetermined voltage level that determines the minimum detect threshold value. An output terminal of amplifier 150 is coupled through diode 154 back to a negative input terminal of amplifier 150 and to the positive input terminal of amplifier 160.

The minimum detect threshold value produced by amplifier 150 is summed with the adaptive detect threshold level signal output from amplifier 140 through resistor 146 in order to obtain a detect threshold signal at the positive input terminal of amplifier 160. A negative input terminal of amplifier 160 is connected to the input terminal $D_{IN}$ of receiver 100. Amplifier 160 acts as a detect comparator by comparing the incoming signal received through $D_{IN}$ with the detect threshold signal generated by the rest of the circuit of receiver 100. When the level of the received signal at $D_{IN}$ exceeds the detect threshold value, then amplifier 160 produces a signal transition in the output signal at $D_{OUT}$.

The approach reflected in receiver 100 in FIG. 2 is a form of adaptive and predictive gain control that involves bandwidth filtering the receive noise, fullwave rectifying the noise to determine its average alternating current (AC) value, lowpass filtering the result and then using the result to proportionally increase the detect threshold level at the positive input of amplifier 160 by several times the average noise level. This approach takes advantage of the larger peak to average AC level of a valid signal versus the lower peak to average AC level of high frequency inverter fluorescent noise sources. It also exploits the relationship between increased average ambient noise and increased peak noise.

One concrete application of the present invention is IrDA communication systems, which are often operated in the presence of fluorescent lights and other sources of ambient infrared noise. Slow speed IrDA communication, which takes place below 115 Kbps, uses a protocol which limits signal pulse width to either 1.63 microseconds (us) or 3/16 of a clock period. Typically, IrDA designers use the smaller pulse width of 1.63 us (which is 3/16 of the clock rate at 115 Kbps) to conserve transmit power. Consequently, at the fast data rate of 115 Kbps the maximum duty cycle is 3/16, although the average duty cycle is 3/32, since typically only one half of the bit periods have pulses.

Furthermore, at slower data rates, the duty cycle of the signal decreases even further. When these signals are AC fullwave rectified and lowpass filtered, they produce an average level of about 0.15 times the peak signal level for 3/32 duty cycle typical for a 115 Kbps link. For slower speeds, the average fullwave rectified value is lower still.

Fluorescent lights with high frequency inverters emit infrared noise that is modulated with either a sinewave at the inverter frequency or with a full wave rectified waveform at twice the inverter frequency. When these signals are AC fullwave rectified, they produce an average level of up to 0.6 times the peak level. Since the average to peak value of the noise is up to four times the average to peak value of data signals, this average to peak value can be used to adjust the detect threshold level. With the proper scaling factor, the average to peak value can be used to set a lower detect threshold level so that valid data will be detected, but noise arising from fluorescent electronic ballasts will increase the detect threshold level sufficiently above the peak noise level to prevent spurious transitions in the output signal of the receiver.

For example, if the averaged output from the AC fullwave rectifier, e.g. amplifier 130 along with diode 136, is used to raise the detector threshold level above the predetermined minimum detect level to a value which is 3.3 times the averaged AC level, then when valid data is present in the example above, the detector will be set to a value which is (3.3*0.15) or 0.5 times the peak signal value, which is an ideal value for a detect comparator.

FIG. 3A illustrates an example of a valid 115 Kbps IrDA signal with a 1.63 us pulse width, as it would appear at DIN and the negative input terminal of detect comparator amplifier 160, in relation to the AC rectified level output by the AC fullwave rectifier and the detect threshold level value obtained by amplifying the AC rectified level by 3.3 in amplifier 140. FIG. 3B illustrates the resulting output data signal generated by amplifier 160 and output at DOUT.

Conversely, when fluorescent inverter noise is present with an average AC value of 0.6, then the detector will be set to (3.3*0.6) or 2 times the peak signal value, which prevents the detect comparator from being triggered by noise up to twice the peak value of the inverter signal. FIG. 3C illustrates an example of a fluorescent noise signal present at DIN in relation to the average AC rectified level output by the AC fullwave rectifier and the detect threshold level value obtained by amplifying the AC rectified level by 3.3 in amplifier 140. Note that the peaks of the noise signal never reach the detect level threshold and, consequently, there is no transition in the data signal output by amplifer 160, as shown in FIG. 3D.

For this approach to be compatible with IrDA protocols faster than 115 Kbps, the input to the AC rectifier circuit needs to be filtered to block signals above 200 Khz. This is because IrDA protocols above 115 Kbps use higher duty cycle signals that would inefficiently raise the detector threshold and thereby desensitize the receiver. Because most fluorescent light noise is below 200 Khz, this filtering does not degrade the noise performance for these frequencies.

The approach of receiver 100 is not only effective against the infrared noise produced by fluorescent lights with high frequency electronic ballasts, but is also effective against any high duty cycle noise present at the detector input. This electrical noise may come from a number of sources; such as noise on the receiver IC supply voltage (power supply AC susceptibility) or electrical noise in the receiver environment that is coupled into the receiver input.

The approach of receiver 100 is most effective in providing a large detector margin against noise sources which have high average to peak values, but this approach becomes less effective as this ratio decreases. Consequently, receiver 100 is highly effective against a square wave noise source, but may be somewhat less effective against a sine wave source or a Gaussian noise source, and may be still less against burst noise.

However, the effectiveness of receiver 100 against Gaussian noise can be improved by increasing the scaling value by which the detect threshold level is set above the average AC noise level. For example, if the detector level is set to about 4 to 5 times the average AC noise level, then a Gaussian noise source would likely not produce an objectionable spurious hit rate. However, the detect threshold level cannot be set higher than about 6 to 7 times the average AC noise level without having the detect threshold level rise too high above the IrDA signal level, thereby disrupting IrDA signal detection.

Figure 4:
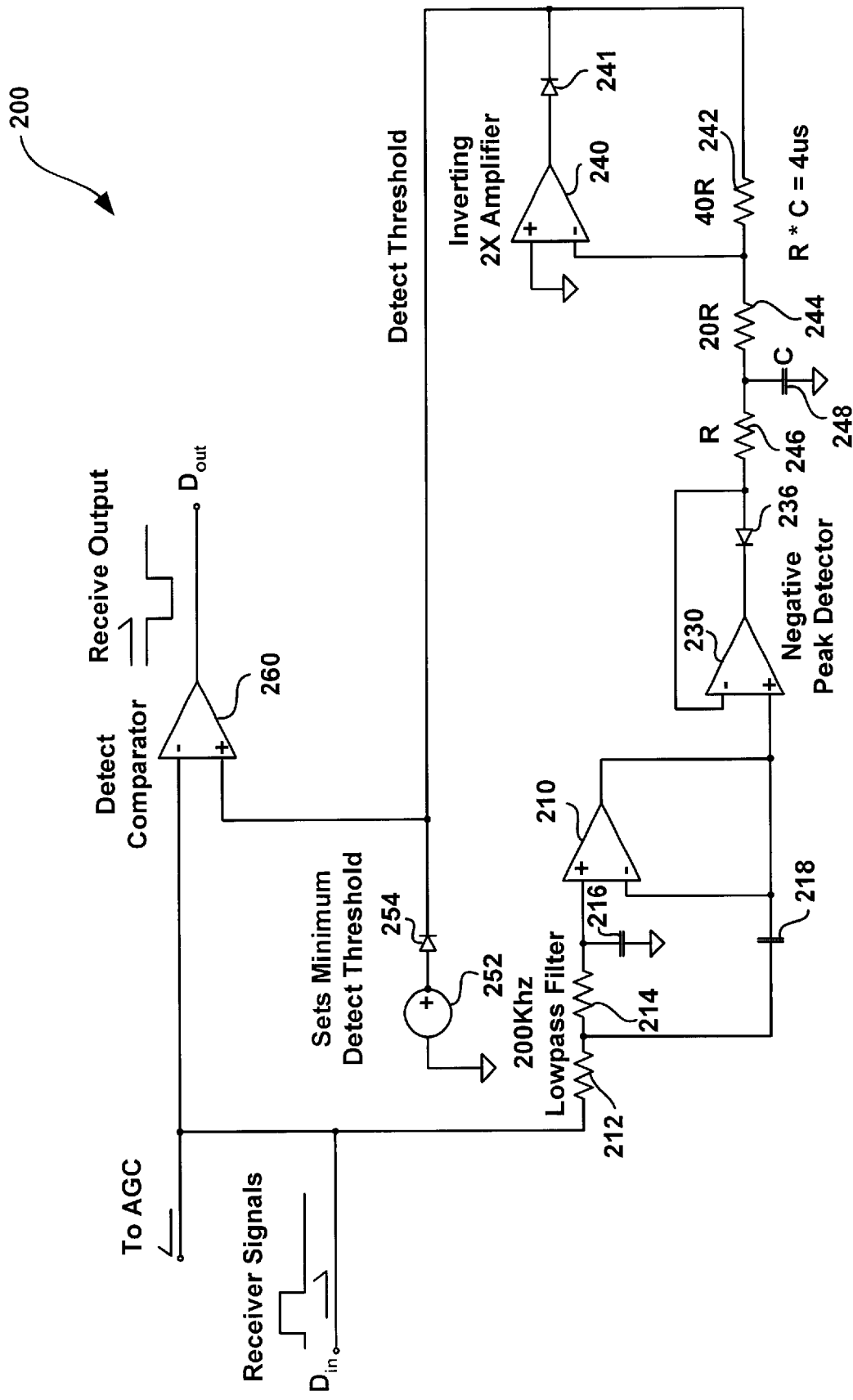
FIG. 4 is a functional block diagram illustrating another embodiment of a conventional infrared receiver circuit.

FIG. 4 is a functional block diagram illustrating another embodiment of a receiver 200 according to the present invention. Receiver 200 has an input terminal $D_{IN}$ for receiving an incoming signal that may include a data signal component or a noise signal component. Receiver 200 also has an output terminal $D_{OUT}$ for outputting an output data signal generated by the receiver.

The incoming signal received at DIN is input to a 200 KHz lowpass filter portion of receiver 200. $D_{IN}$ is connected through resistor 212 and resistor 214 to a positive input terminal of amplifier 210. Capacitor 216 couples the positive input terminal of amplifier 210 to a ground potential contact. Another capacitor 218 couples a negative input terminal of amplifier 210 to a common node of resistors 212 and 214. An output terminal of amplifier 210 is coupled to the negative input terminal of amplifier 210 and to a positive input terminal of amplifier 230.

Amplifier 230 combines with diode 236 to form a negative peak detector. A cathode of diode 236 is connected to the output terminal of the amplifier while an anode of diode 236 is coupled to a negative input terminal of the amplifier and to resistor 246. The negative peak detector averages the negative peaks of the received signal. The averaged signal is then input to a low pass filter composed of resistor 246 and capacitor 248 that integrates the averaged signal. In this exemplary embodiment, the resistance value of resistor 246 and capacitance of capacitor 248 are selected such that R*C=4 us.

Resistor 246 and capacitor 248 are connected through resistor 244 to a negative input terminal of amplifier 240 and to resistor 242. An anode of diode 241 is connected to an output terminal of amplifier 240 and a cathode of diode 241 is connected to resistor 242. A positive input terminal of amplifier 240 is connected to the ground potential contact. The values of resistors 241 and 244 are selected such that amplifier 240 scales the average AC level stored by capacitor 248 by inverting and amplifying the averaged AC level by a factor of two in order to produce the adaptive detect threshold signal.

The adaptive detect threshold signal is then summed with a minimum detect level signal produced by voltage reference 252 and diode 254 to obtain a detect threshold level signal. Note that voltage reference 252 defines the minimum detect level relative to a signal ground. The signal ground represents the average DC level of the signal present at DIN, which is typically obtained by integrating the average signal level. Voltage reference 252 therefore sets the minimum detect threshold level signal relative to the average DC level present at DIN.

The detect threshold level signal is input to a positive input terminal of amplifier 260 and a negative input terminal of amplifier 260 is coupled to DIN. Amplifier 260 will compare the incoming signal received from DIN to the detect threshold level signal in order to produce an output data signal at DOUT.

The approach of receiver 200 is similar to that of receiver 100 except that, instead of full wave rectifying the received signal to determine its average AC value, negative noise peaks output by amplifier 230 are applied through diode 236 to an RC network, resistor 246 and capacitor 248, to obtain a fast attack and slow decay response in order that produces the average AC value. Capacitor 248 is coupled to the signal ground so that the voltage present at the common node of resistor 246 and capacitor 248 is the difference between the output from the fast attack and slow decay RC network and the average DC level, which is inverted and multiplied by several fold for use in setting the signal detect level. Compared to the average DC level of the signal ground, receiver 200 takes advantage of the difference between the smaller amplitude negative signal peaks versus the larger amplitude negative noise peaks.

The approach of receiver 200 differs from that of receiver 100 in that replaces the full wave AC detector with a negative peak detector and fast attack slow decay RC network whose output is used to increase the detect level by several times the difference between the negative peak output and the average DC level of the signal. Using the negative peaks may provide on the order of a two fold improvement over the response of receiver 100 in detect level discrimination between valid signals and noise.

For example, with a 3/32 average duty cycle IrDA signal, relative to the average DC level, the signal negative peak will be about (3/32)/(13/32) or 0.115 of the positive peak value. However, with a high frequency noise signal (such as from a fluorescent light with a high frequency electronic ballast) that consists of either a full wave rectified waveform or a sinewave, relative to the average DC level, the negative peaks will typically be at least equal to the positive peak value. Consequently, if the negative peak detector increases the positive detect level by two times the negative peak level, then the valid signal would increase the detect level by 0.23, in this example, and only slightly decrease the detect sensitivity for a valid signal. However, the presence of fluorescent light noise would increase the detect threshold level by two times the peak positive signal level thereby placing the detect threshold level above the positive noise peaks by about their own magnitude value so as to prevent spurious transitions in the output signal due to noise detection.

In other words, once a valid signal or a noise signal is normalized, i.e. the average DC level is set to a fixed value and the peak signal level is automatic gain controlled to a different fixed level that is typically twice the detect threshold, then the negative peaks, relative to the average DC level, for the noise signal will be more negative than for a valid data signal.

Figure 1:
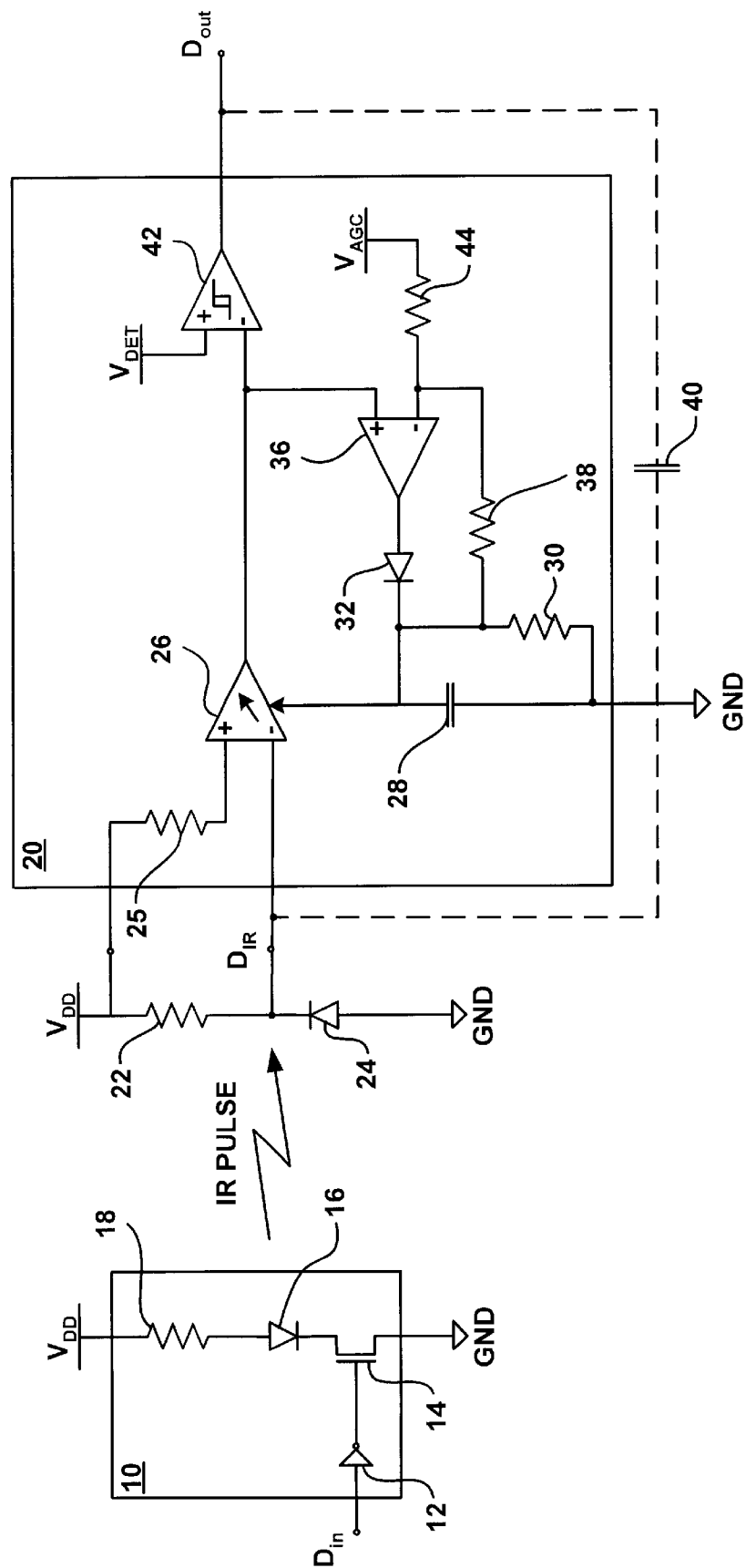
FIG. 1 is a functional block diagram illustrating an embodiment of a conventional infrared receiver circuit.

Receiver 200 exploits this relative difference between the negative peak amplitudes of the noise and data signals in order to capture the data signal for output. When noise is present, then the peak negative amplitudes are larger than for a data signal, once the signals are normalized, such as the normalization performed by the AGC circuit found in FIG. 1. Thus, the increased negative peak signal when noise is present can be used to increase the detect threshold for the circuit. Because the duty cycle of the valid data signal is typically relatively low, its average DC level is much nearer to the data signal negative peak excursion than to its positive peak excursion. In contrast, a noise signal typically has an average DC level that is near its center peak to peak value. Consequently, the AGC circuitry that normalizes the signal will also tend to center the incoming signal such that the negative peaks will be greater, i.e. more negative, for a typical noise signal than for a valid data signal, such as an IrDA 115 Kbps data signal.

Receiver 200 has a larger margin by which the detector level may be increased than that available in receiver 100. In receiver 200, the detect threshold level can be increased by anywhere from about 1 to 8 times the negative peak level.

If the multiplier value is less than 1, then noise suppression will not occur and if it is more than 6–8, then detection of a valid signal will not be reliable.

Although both receiver 100 and 200 are effective at reducing spurious output signal transitions when the receiver is presented with continuous noise with high duty cycle, they are less effective against burst noise. However, it is possible to add additional circuitry to receiver 100 and 200 that will improve their effectiveness against burst noise and improve their signal to noise ratio when a signal is present.

Figure 5:
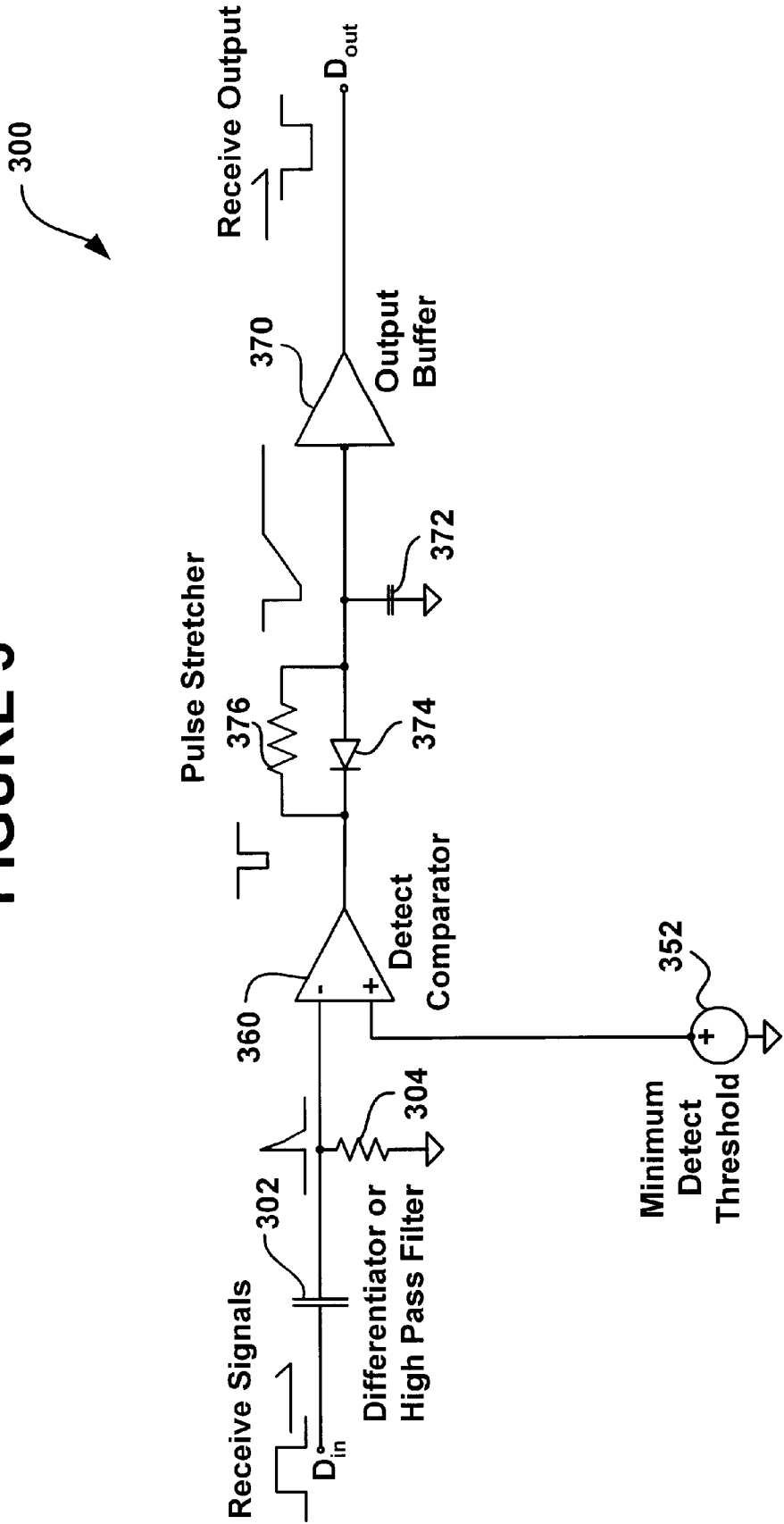
FIG. 5 is a functional block diagram illustrating an embodiment of an output circuit for use with the receivers of FIGS. 2 and 4.
Figure 7:
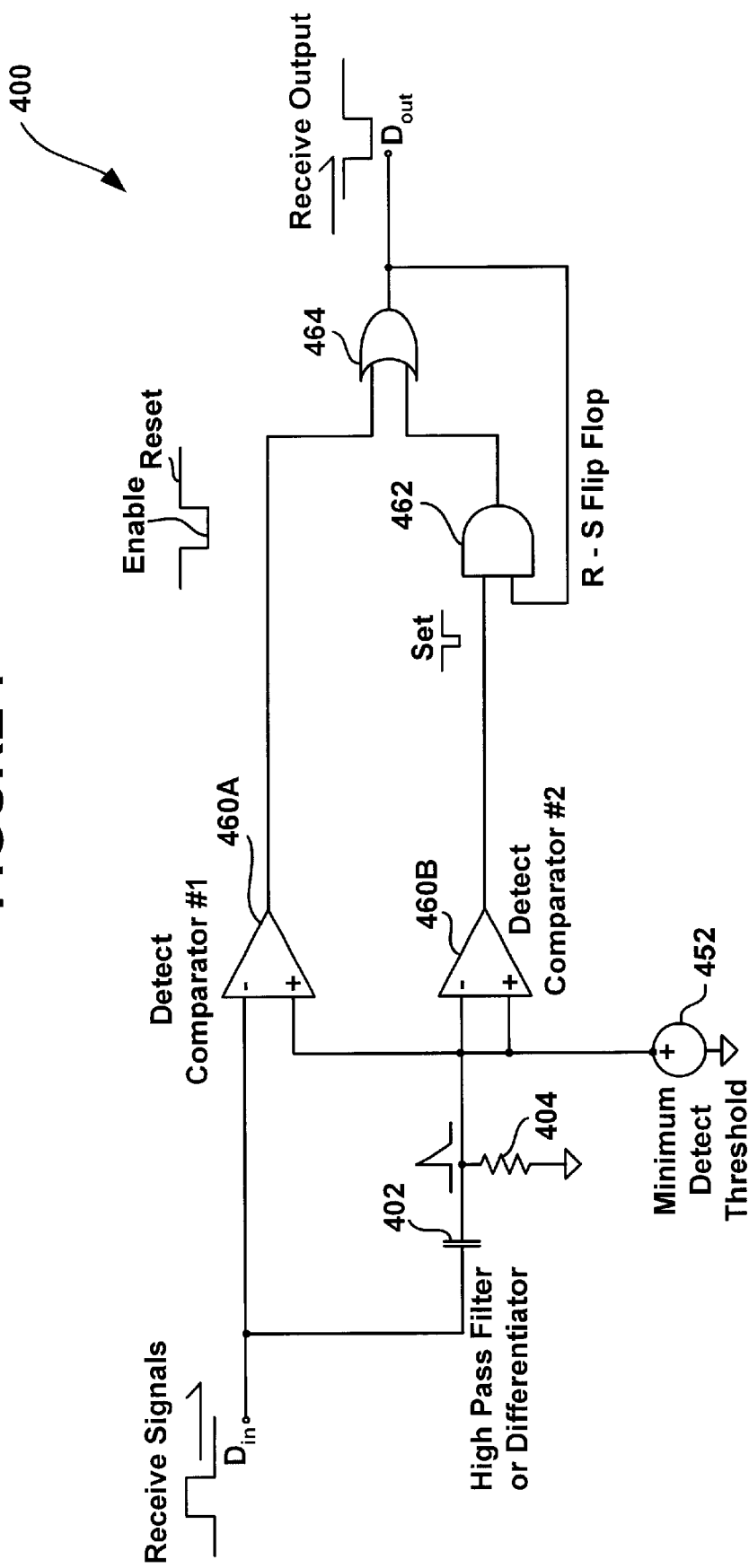
FIG. 7 is a functional block diagram illustrating another embodiment of an output circuit for use with the receivers of FIGS. 2 and 4.
Figure 9:
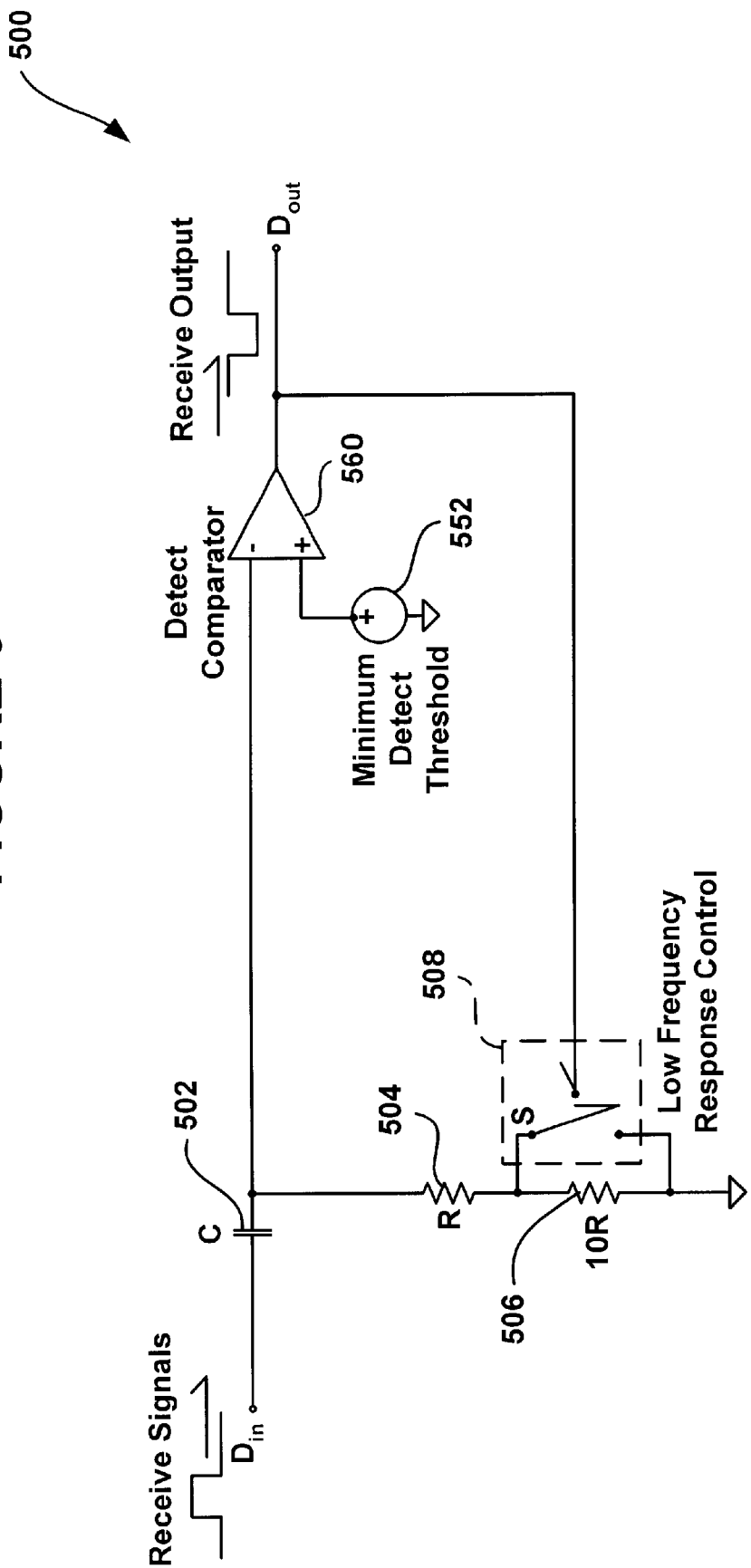
FIG. 9 is a functional block diagram illustrating yet another embodiment of an output circuit for use with the receivers of FIGS. 2 and 4.

FIGS. 5, 7 and 9 illustrate embodiments of output circuits that can be combined with receivers 100 and 200 and are effective against noise below a predetermined cutoff frequency. These output circuits perform dynamic bandwidth filtering that is effective against noise below the cutoff frequency, typically 200 Khz, such as the noise from fluorescent lights. These output circuits are effective against burst noise from fluorescent lights and are also effective against any noise which has a rise time significantly slower than the signal rise time. In addition, the output circuits improve the signal to noise ratio of the receiver when a valid signal is present.

Output circuit 300 in FIG. 5 is constructed from a differentiator or high pass filter and a signal detect comparator followed by a pulse stretcher. In output circuit 300, a high pass filter composed of capacitor 302, that also blocks the DC level of the incoming signal, and resistor 304 is coupled between DIN and a negative input terminal of an output detect comparator amplifier 360, which corresponds to the detect comparator amplifiers of receivers 100 and 200. An output terminal of amplifier 360 is coupled to capacitor 372 through diode 374 and resistor 376. An output buffer 370 is coupled between capacitor 372 and DOUT.

Output circuit 300 operates as a highpass filter that has a low frequency response comer at about 200 Khz. This results in significant attenuation of slow edged noise signals below 200 Khz. If a valid signal pulse with a fast edge is present, then it will not be attenuated because of its high speed. When such a signal is detected it typically produces a short pulse, typically less than 500 ns for IrDA. A pulse stretcher or one-shot, composed of resistor 376, diode 374 and capacitor 372, is used to produce a 1.63 us output pulse, which is required for full compatibility with most IRDA Infrared Communication Controllers or UARTS.

Figure 6:
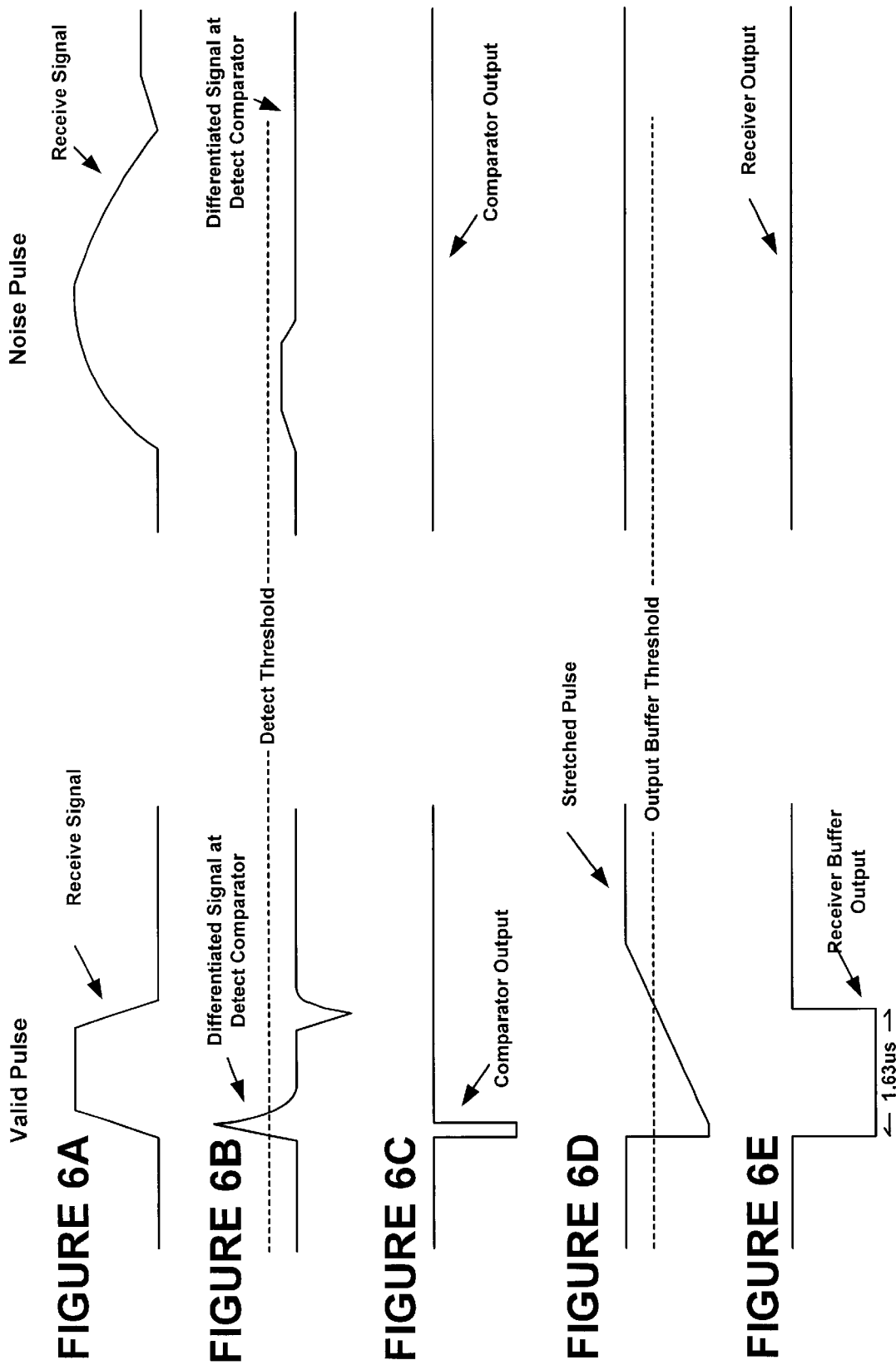
FIGS. 6A–E are waveform diagrams illustrating the function of the output circuit of FIG. 5.

FIGS. 6A–E are waveform diagrams illustrating the response of output circuit 300 when a valid pulse is present and when a noise signal is present. Note that the edge of the valid pulse in FIG. 6A is much faster, i.e. more sharply vertical, than the more rounded edge of the noise pulse. FIG. 6B shows how these two signals are shaped by the high pass filter between the negative input of detect amplifier 360 and DIN and how only the positive going edge of the valid pulse results in a response that exceeds the detect threshold level for the detect comparator.

Consequently, only the valid pulse results in an inverted signal transition at the output of amplifier 360, as shown in FIG. 6C. The low going pulse at the output of amplifier 360 rapidly discharges capacitor 372 primarily through diode 374, which pulls the signal at the input of output buffer 370 below the transition threshold of the buffer, which drives the output signal at DOUT low. However, once the output signal of detect amplifier 360 goes high, capacitor 372 recharges only through resistor 376, thereby stretching the signal pulse width, as determined by the RC constant of resistor 376 and capacitor 372, by extending the time required to charge capacitor 372 to the buffer transition threshold, as shown in FIGS. 6D and 6E.

Although the approach of output circuit 300 works well, there are limitations to its application. If the circuit is fabricated in a modem IC process, then the output pulse width will be dependent upon the tolerance of internal components. Typically, this will result in pulse width tolerance of approximately +/−30%. Also, with high capacitive feedback between the receiver output DOUT and photodiode input DIN, the output trailing edge of the output signal at DOUT may potentially cause extra trigger pulses due to a significant increase in overshoot caused by the differentiator or the 200 Khz low frequency comer on the bandpass filter. Another limitation is that output circuit 300 cannot be used with a single mode IrDA receiver designed to handle data faster than 115 Kbps since the faster signal speed requires shorter pulses.

FIG. 7 illustrates another embodiment of an output circuit 400 for use in the receivers according to the present invention. Output circuit 400 is composed of a pair of signal detect comparator amplifiers 460A and 460B preceded by a differentiator or highpass filter composed of capacitor 402 and resistor 404. The output of these two detectors is used to drive an R-S flip flop composed of AND gate 462 and OR gate 464 that requires both detector inputs to be above the detect threshold from voltage reference 452 to produce a receiver output signal transition at DOUT. The R-S flip-flop output returns to the quiescent state only when the input to the standard signal detector falls below the detect threshold.

FIGS. 8A–E are waveform diagrams illustrating the response of output circuit 400 when a valid pulse is present and when a noise signal is present. FIG. 8A shows the incoming signal as it appears at DIN and the input to detect amplifier 460A. FIG. 8B shows the resulting signal at the output of detect amplifier 460A, which transitions for both the valid pulse and the noise pulse.

In output circuit 400, the high frequency component of a pulse, input to detect amplifier 460B, is used to validate detection while the low frequency component, input to detect amplifer 460A, is used to determine when the pulse ends. If a valid signal pulse is present, then the pulse will drive the inputs of both of the detect comparator amplifiers 460A and 460B above the detect threshold causing a receiver output to occur, as shown in FIGS. 8A–D. Then, although the signal falls below detect threshold thereafter at the input of detect amplifier 460B that is preceded by the high pass filter composed of capacitor 402 and resistor 404. The R-S flip flop will maintain the receiver output signal at DOUT in the asserted state until the input to detect amplifier 460A falls below its threshold and resets the flip-flop.

Yet another embodiment of an output circuit 500 for use in the receivers according to the present invention is shown in FIG. 9. Output circuit 500 is constructed from a highpass filter having a lower frequency response that is controllable with the output signal from the detect comparator 560. In output circuit 500, capacitor 502 connects DIN to a negative input terminal of detect amplifier 560 that drives output terminal DOUT. Resistor 504 and resistor 506 are connected in series between the negative input terminal of amplifier 560 and a ground potential contact. The value of resistor 506 is an order of magnitude greater than that of resistor 504.

A switch 508 is connected in parallel with resistor 506 and is controlled by the output of amplifier 560. Switch 508 will be closed when no signal is detected and the output signal is high. However, when a signal is detected and the output transitions to a low, then the switch will open in order to change the cutoff frequency of the high pass filter formed by capacitor 502 and resistors 504 and 506. The RC constant of resistor 504 with capacitor 502 is selected to obtain an 800 nanosecond response for a 200 KHZ low frequency comer. The RC constant of both resistor 504 and resistor 506 with capacitor 502 is selected to obtain a lower frequency cutoff comer, such as 20 Khz.

Figure 10A:
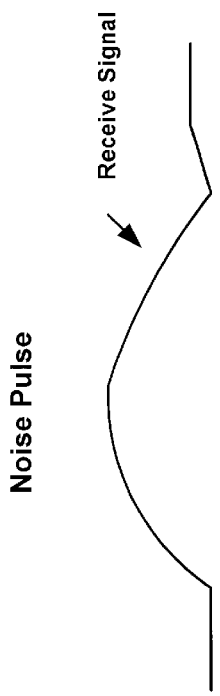
FIGS. 10A–D are waveform diagrams illustrating the function of the output circuit of FIG. 9.
Figure 10B:
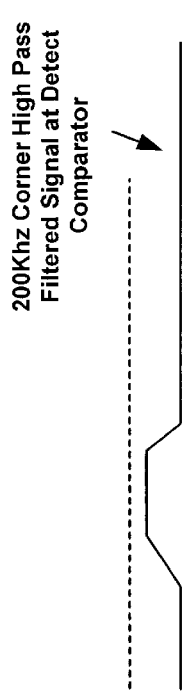
Figure 10C:
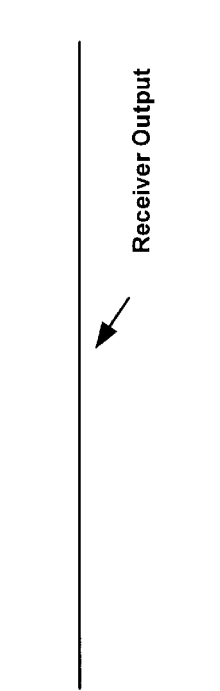
Figure 10D:
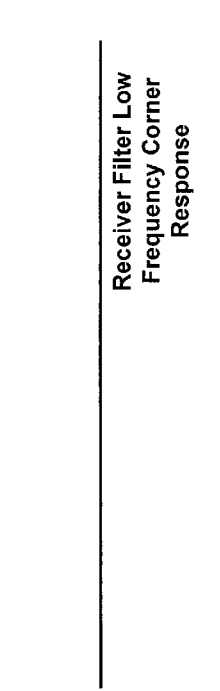

FIGS. 10A–D are waveform diagrams illustrating the response of output circuit 400 when a valid pulse is present and when a noise signal is present. FIG. 10A shows the incoming signal as it appears at DIN. FIG. 10B shows the resulting signal at the input to detect amplifier 560 and illustrates how the higher cut-off frequency when switch 508 is closed allows the signal at the input of the detect amplifier to exceed the detect threshold level when a valid pulse is present, but prevents the slower noise signal from reaching the threshold. The resulting output from detect amplifier 560 is shown in FIG. 10C. Thus, the lower cutoff comer of the high pass filter section depends upon the state of the output signal, as illustrated in FIG. 10D.

Output circuits 300, 400 and 500 exploit the difference in leading edge pulse rise time between an IrDA compliant optical pulse and a fluorescent light noise transient. All IrDA infrared transmit pulses are specified to have optical rise times of less than 600 ns (but typically are less than 200 ns) for data rates below 115 Kbps and less than 40 ns for data rates above 115 Kbps. Since an IrDA pulse with a rise time faster than 600 ns corresponds to an edge bandwidth greater than 500 Khz and the rise time of fluorescent light noise is below 200 Khz, then by measuring pulse rise time it is possible to discriminate between a noise pulse and a valid IrDA pulse by rejecting any pulse which has a sufficiently slow edge.

In output circuit 500, before detecting a pulse at the detect comparator, the receiver low frequency rolloff comer is set to a relatively high value of around 200 Khz, which results in significant attenuation of slow edged noise signals below 200 Khz. Only if a valid signal with a fast edge is present will detection occur. However, after detecting a pulse, the receiver low frequency comer is reduced to around 20 Khz, which allows for sufficient low frequency response so as to give good minimum pulse width response on the trailing edge of the pulse.

Each of the output circuits 300, 400 and 500 has various advantages and disadvantages, which will determine which circuit should be selected based upon the system requirements, specific IC system architecture, and integrated circuit (IC) processes used.

Although the approach of circuit 400 is somewhat more complex than that of circuit 300, circuit 400 will have output pulse width timing that is typically more accurate, since it is determined by the actual signal pulse width. Also, with output circuit 400, the system AGC can be driven from a separate wideband signal, which will limit the maximum noise level passed to the differentiator so that it only needs to attenuate the noise by a small limited amount in order to prevent spurious output transitions due to noise.

In some IC designs, the approach of output circuit 500 is easier to implement than output circuit 400. In these designs, the gyrator circuit which removes the photodiode DC signal component can be controlled to move the low frequency cutoff corner from 200 Khz to less than 20 Khz when a signal is detected. Changing the gain of the gyrator moves the gyrator low frequency cutoff comer.

As noted above, the output circuits 300, 400 and 500 can be used to replace the detect amplifiers 160 and 260 of receivers 100 and 200, respectively, in order to obtain the effectiveness of the output circuits in suppressing slow edged noise impulses in addition to the effectiveness of the receiver circuits in suppressing noise impulses which have edges closer in speed or bandwidth to that of a valid IrDA pulse.

Figure 11:
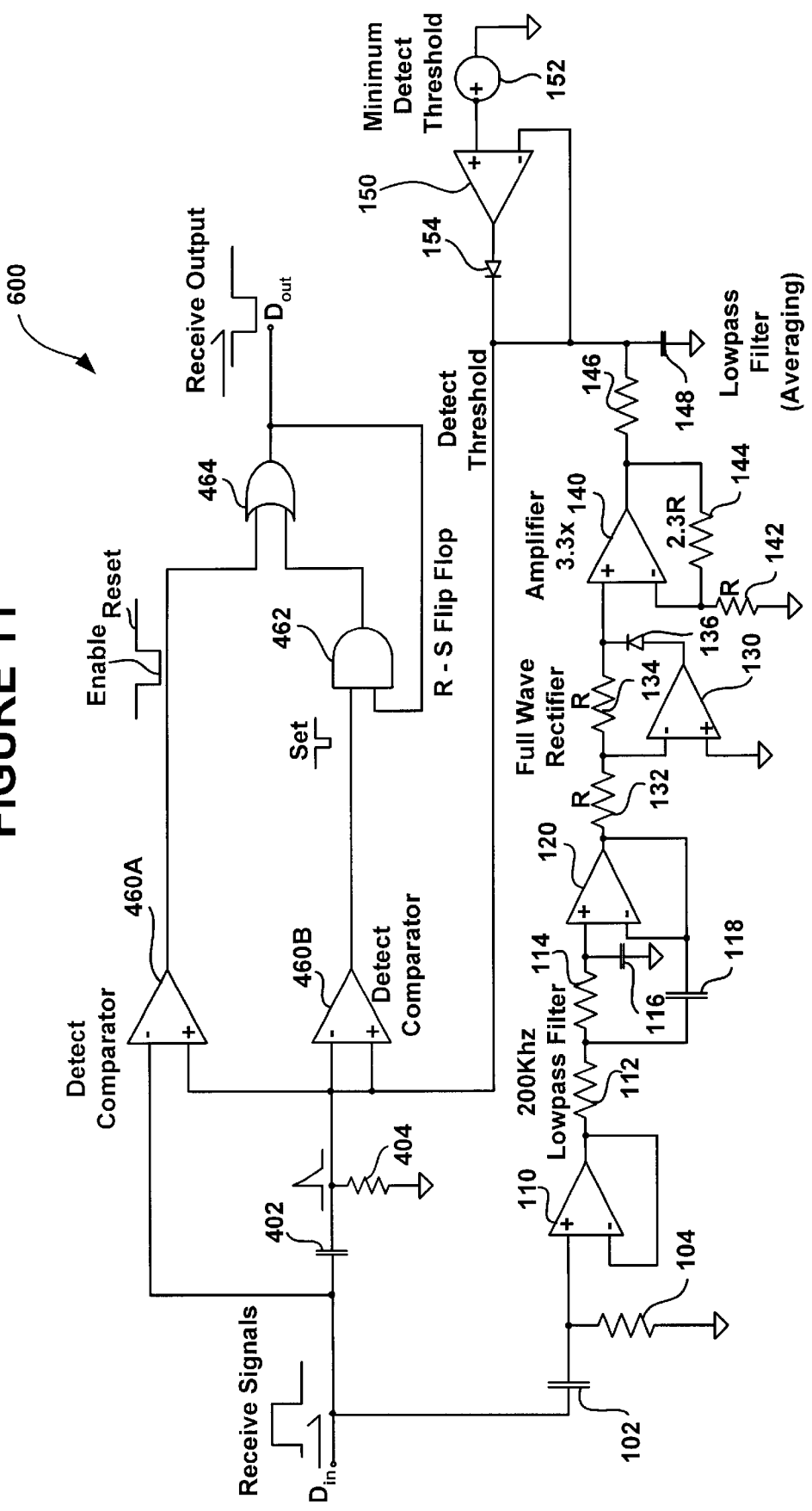
FIG. 11 is a functional block diagram illustrating the combination of the output circuit of FIG. 7 with the receiver of FIG. 2.

FIG. 11 illustrates the combination 600 of receiver 100 of FIG. 2 with the output circuit 400 of FIG. 7. Each of the output circuits can be combined with each of the receivers because the noise mitigation methods represented are synergistic and when used together in the same receiver circuit can increase overall noise immunity. By combining the output circuits with the receiver circuits, the total noise immunity is higher than the sum of the individual immunities conferred by any of the circuits used in isolation. This is because the approaches used in the receiver circuits and the approaches used in the output circuits exploit differences in the types of information present in valid signals and noise signals.

For example, in environments where the dominant noise source is from fluorescent lights with a high frequency electronic ballast, i.e. where the noise has a high average to peak value against which receivers 100 and 200 are effective, there is usually some peak noise on the tops of the repetitive inverter peaks. This peak noise may sometimes exceed the higher detect level produce in the approach of either receiver 100 or 200. However, using the output circuits increases the probability of rejecting these noise peaks since they also attenuate the amplitude of the slower noise peaks passing through the differentiator or high pass filter preceding the detect amplifier. Thus, when this type of noise is present, both the detect level is increased and the noise signal to the detector is attenuated, which reduces the probability of spurious signal transitions due to noise detection to less than what would occur with just the approach of the receiver circuits or just the approach of the output circuits.

Having illustrated and described the principles of the present invention in the context of the embodiments described above, it should be readily apparent to those skilled in the art that the invention can be modified in arrangement and detail without departing from such principles. For example, while the present invention is described above in the context of an infrared receiver, it should be readily understood that the present invention is applicable to other signal receivers which experience various noise signals without departing from the scope and spirit of the present invention. We claim all modifications and variations coming within the spirit and scope of the present invention.

We claim:

1. A receiver circuit having a receiver input terminal for receiving an incoming signal and a receiver output terminal for outputting a data signal, the receiver comprising:

an detect comparator output circuit having an output terminal coupled to the receiver output terminal, a first input terminal coupled to the receiver input terminal and an second input terminal for receiving a detect threshold signal, where the detect comparator output circuit is configured to compare the incoming signal to the detect threshold signal in order to generate the data signal at the receiver output terminal;

a minimum detect threshold circuit having an output terminal coupled to the second input terminal of the detect comparator output circuit, where the minimum detect threshold circuit it configured to generate a minimum detect threshold level signal at the output terminal;

a noise bandpass filter circuit having an input terminal coupled to the receiver input terminal and an output terminal for outputting a filtered incoming signal, where the noise bandpass filter circuit is configured to pass a predetermined bandwidth corresponding to a noise signal;

a signal averaging circuit having an input terminal coupled to the output terminal of the noise bandpass filter circuit and an output terminal, where the signal averaging circuit is configured to average the filtered incoming signal to produce an averaged signal for output at the output terminal of the signal averaging circuit; and an integration and scaling circuit having an input terminal coupled to the output terminal of the signal averaging circuit and an output terminal coupled to the second input terminal of the detect comparator output circuit, where the integration and scaling circuit is configured to integrate the averaged signal received from the signal averaging circuit and scale the averaged signal by a predetermined constant in order to generate an adaptive detection threshold signal at the output terminal of the integration and scaling circuit, such that the minimum detect threshold level signal and the adaptive detect threshold signal are summed at the second input terminal of the detect comparator output circuit to produce the detect threshold signal.

2. The receiver circuit of claim 1, where the signal averaging circuit further comprises a full wave rectifier circuit configured to full wave rectify the filtered incoming signal received at the input terminal of the signal averaging circuit in order to generate the averaged signal at the output terminal of the signal averaging circuit.

3. The receiver circuit of claim 2, where the integration and scaling circuit further comprises:

an amplifier having an input terminal coupled to the output terminal of the signal averaging circuit and an output terminal, where the amplifier is configured to amplify the averaged signal received at the input terminal of the integration and scaling circuit by the predetermined constant in order to generate a scaled averaged signal at an output terminal of the amplifier; and a low pass filter having an input terminal coupled to the output terminal of the amplifier, where the low pass filter is configured to integrate the scaled averaged signal in order to generate the adaptive detection threshold signal at the output terminal of the integration and scaling circuit.

4. The receiver of claim 3, where the noise bandpass filter circuit has an upper cutoff frequency of 200 KHz.

5. The receiver of claim 4, where the predetermined constant is approximately 3.3.

6. The receiver of claim 3, where the detect comparator output circuit further comprises another amplifier having a first input terminal coupled to the receiver input terminal, an output terminal coupled to the receiver output terminal and a second input terminal for receiving the detect threshold signal.

7. The receiver of claim 3, where the detect comparator output circuit further comprises:

a high pass filter having an input terminal coupled to the receiver input terminal and an output terminal;

another amplifier having a first input terminal coupled to the output terminal of the high pass filter, a second input terminal for receiving the detect threshold signal, and an output terminal;

a pulse stretcher circuit having an input terminal coupled to the output terminal of the another amplifier and an output terminal, where the pulse stretcher circuit is configured to produce a stretched pulse at the output terminal of the pulse stretcher circuit by responding rapidly to an edge transition from a first voltage level to a second voltage level at the output terminal of the another amplifier and responding relatively slowly to an edge transition from the second voltage level to the first voltage level at the output terminal of the another amplifier; and an output buffer having an input terminal coupled to the output terminal of the pulse stretcher and an output terminal coupled to the receiver output terminal.

8. The receiver of claim 7, where the pulse stretcher circuit further comprises:

a resistor having a first terminal coupled to the output terminal of the another amplifier and a second terminal coupled to the input terminal of the output buffer;

a diode having a first terminal coupled to the output terminal of the another amplifier and a second terminal coupled to the input terminal of the output buffer; and a capacitor having a first terminal coupled to the input terminal of the output buffer and a second terminal coupled to a ground potential contact.

9. The receiver of claim 3, where the detect comparator output circuit further comprises:

a high pass filter having an input terminal coupled to the receiver input terminal and an output terminal;

a first another amplifier having a first input terminal coupled to the receiver input terminal, a second input terminal for receiving the detect threshold signal, and an output terminal;

a second another amplifier having a first input terminal coupled to the output terminal of the high pass filter, a second input terminal for receiving the detect threshold signal, and an output terminal; and an RS flip-flop having a reset terminal coupled to the output terminal of the first another amplifier, a set terminal coupled to the output terminal of the second another amplifier, and an output terminal coupled to the receiver output terminal.

10. The receiver circuit of claim 1, where the signal averaging circuit further comprises a negative peak detector configured to detect negative peaks of the filtered incoming signal received at the input terminal of the signal averaging circuit in order to generate the averaged signal at the output terminal of the signal averaging circuit.

11. The receiver circuit of claim 10, where the integration and scaling circuit further comprises:

a low pass filter having an input terminal coupled to the input terminal of the integration and scaling circuit, where the low pass filter is configured to integrate the averaged signal in order to generate an integrated averaged signal at an output terminal of the low pass filter; and an amplifier having an input terminal coupled to the output terminal of the low pass filter, where the amplifier is configured to amplify the integrated averaged signal by the predetermined constant in order to generate the adaptive detection threshold signal at the output terminal of the integration and scaling circuit.

12. The receiver of claim 11, where the noise bandpass filter circuit has an upper cut-off frequency of 200 KHz.

13. The receiver of claim 12, where the predetermined constant is approximately 2.

14. The receiver of claim 11, where the detect comparator output circuit further comprises another amplifier having a first input terminal coupled to the receiver input terminal, an output terminal coupled to the receiver output terminal and a second input terminal for receiving the detect threshold signal.

15. The receiver of claim 11, where the detect comparator output circuit further comprises:
   a high pass filter having an input terminal coupled to the receiver input terminal and an output terminal;
   another amplifier having a first input terminal coupled to the output terminal of the high pass filter, a second input terminal for receiving the detect threshold signal, and an output terminal;
   a pulse stretcher circuit having an input terminal coupled to the output terminal of the another amplifier and an output terminal, where the pulse stretcher circuit is configured to produce a stretched pulse at the output terminal of the pulse stretcher circuit by responding rapidly to an edge transition from a first voltage level to a second voltage level at the output terminal of the another amplifier and responding relatively slowly to an edge transition from the second voltage level to the first voltage level at the output terminal of the another amplifier; and
   an output buffer having an input terminal coupled to the output terminal of the pulse stretcher and an output terminal coupled to the receiver output terminal.

16. The receiver of claim 15, where the pulse stretcher circuit further comprises:
   a resistor having a first terminal coupled to the output terminal of the another amplifier and a second terminal coupled to the input terminal of the output buffer;
   a diode having a first terminal coupled to the output terminal of the another amplifier and a second terminal coupled to the input terminal of the output buffer; and
   a capacitor having a first terminal coupled to the input terminal of the output buffer and a second terminal coupled to a ground potential contact.

17. The receiver of claim 11, where the detect comparator output circuit further comprises:
   a high pass filter having an input terminal coupled to the receiver input terminal and an output terminal;
   a first another amplifier having a first input terminal coupled to the receiver input terminal, a second input terminal for receiving the detect threshold signal, and an output terminal;
   a second another amplifier having a first input terminal coupled to the output terminal of the high pass filter, a second input terminal for receiving the detect threshold signal, and an output terminal; and
   an RS flip-flop having a reset terminal coupled to the output terminal of the first another amplifier, a set terminal coupled to the output terminal of the second another amplifier, and an output terminal coupled to the receiver output terminal.

18. A method for receiving an incoming signal with improved noise immunity, the method comprising the steps:
   bandwidth filtering the incoming signal by passing a predetermined bandwidth corresponding to a noise spectrum;
   averaging the filtered incoming signal to obtain an averaged signal;
   integrating and scaling the averaged signal to produce an adaptive detect threshold level signal;
   summing the adaptive detect threshold level signal with a minimum detect threshold level signal to produce a detect threshold level signal; and
   comparing the incoming signal to the detect threshold level signal to produce a data signal.

19. The method of claim 18, where the step of averaging the filtered incoming signal further comprises full wave rectifying the incoming signal to obtain the averaged signal.

20. The method of claim 19, where the step of integrating and scaling the averaged signal further comprises:
   amplifying the averaged signal by a predetermined constant; and
   low pass filtering the amplified averaged signal to produce the adaptive detect threshold level signal.

21. The method of claim 20, where the step of bandwidth filtering the incoming signal includes filtering out frequencies above 200 KHz.

22. The method of claim 20, where the predetermined constant is 3.3.

23. The method of claim 18, where the step of averaging the filtered incoming signal further comprises detecting the negative peaks of the incoming signal to obtain the averaged signal.

24. The method of claim 23, where the step of integrating and scaling the averaged signal further comprises:
   low pass filtering the averaged signal to obtain an integrated averaged signal; and
   amplifying the integrated averaged signal by a predetermined constant to produce the adaptive detect threshold level signal.

25. The method of claim 24, where the step of bandwidth filtering the incoming signal includes filtering out frequencies above 200 KHz.

26. The method of claim 24, where the predetermined constant is 2.

27. The method of claim 18, where the step of comparing the incoming signal to the detect threshold level signal further comprises the steps:
   high pass filtering the incoming signal;
   comparing the high pass filtered incoming signal to the detect threshold level signal to produce a high frequency pulse;
   stretching the high speed pulse to produce a slow recovering pulse; and
   buffering the slow recovering pulse to produce the data signal.

28. The method of claim 27, where the step of stretching the high speed pulse further comprises:
   responding rapidly to an edge transition of the high speed pulse from a first voltage level to a second voltage level to produce a first edge of the slow recovering pulse; and
   responding relatively slowly to an edge transition of the high speed pulse from the second voltage level to the first voltage level to produce a second edge of the slow recovering pulse.

29. The method of claim 18, where the step of comparing the incoming signal to the detect threshold level signal further comprises the steps:
   high pass filtering the incoming signal;
   comparing the incoming signal to the detect threshold level signal to produce a reset signal;
   comparing the high pass filtered incoming signal to the detect threshold level signal to produce a set signal;
   setting the output signal responsive to the set signal; and
   resetting the output signal responsive to the reset signal.

* * * * *